(12) United States Patent
Perkuhn et al.

(10) Patent No.: US 9,519,453 B2
(45) Date of Patent: Dec. 13, 2016

(54) METHODS, DEVICES AND COMPUTER PROGRAMS FOR TRANSMITTING OR FOR RECEIVING AND PLAYING MEDIA STREAMS

(75) Inventors: Heiko Perkuhn, Bonn (DE); Calin Curescu, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 104 days.

(21) Appl. No.: 14/346,134

(22) PCT Filed: Sep. 21, 2011

(86) PCT No.: PCT/EP2011/066400
§ 371 (c)(1),
(2), (4) Date: Mar. 20, 2014

(87) PCT Pub. No.: WO2013/041132
PCT Pub. Date: Mar. 28, 2013

(65) Prior Publication Data
US 2014/0236333 A1    Aug. 21, 2014

(51) Int. Cl.
*G06F 17/00* (2006.01)
*G06F 3/16* (2006.01)
(Continued)

(52) U.S. Cl.
CPC ............ *G06F 3/165* (2013.01); *H04N 21/432* (2013.01); *H04N 21/4331* (2013.01); *H04N 21/4408* (2013.01); *H04N 21/47202* (2013.01)

(58) Field of Classification Search
CPC .. G11B 27/105; G11B 27/36; G06F 17/30749; G06F 17/30761; H04N 21/4325; H04N 21/432; H04N 21/44204; H04H 20/106
See application file for complete search history.

(56) References Cited

U.S. PATENT DOCUMENTS 6,341,304 B1   1/2002   Engbersen et al.
7,509,667 B1 * 3/2009   Cook .................. H04N 7/1675
                                                     380/200
(Continued)

FOREIGN PATENT DOCUMENTS

CN   1462535 A    12/2003
CN   101442607 A   5/2009
CN   101877779 A  11/2010

OTHER PUBLICATIONS

Phil Kerr, "The Linux MP3—Howto", v1.61, Dec. 16, 2001, http://www.ibiblio.org/pub/Linux/docs/HOWTO/other-formats/html_single/MP3-HOWTO.html#s3, 21 pages.
(Continued)

*Primary Examiner* — Fan Tsang
*Assistant Examiner* — David Siegel
(74) *Attorney, Agent, or Firm* — Rothwell, Figg, Ernst & Manbeck, P.C.

(57) ABSTRACT

A method is carried out by a receiving and playing device (10), for receiving and playing a media stream. The method includes a first playing procedure (s12), a playing mode switching procedure (s14), and a second playing procedure (s16). The first playing procedure (s12) includes receiving a media stream through a communication medium or network (30) and playing the received media stream. The playing mode switching procedure (s14) includes determining (s142) whether a media content about to be received or being received is locally stored and, if so, switching to the second playing procedure (s16). The second playing procedure (s16) includes playing the media content based on at least the locally stored media content. The invention also relates to methods carried out by a transmitting device (20), to receiving and playing devices (10), to transmitting devices (20), and to computer programs.

28 Claims, 11 Drawing Sheets

(51) Int. Cl.
*H04N 21/432* (2011.01)
*H04N 21/433* (2011.01)
*H04N 21/472* (2011.01)
*H04N 21/4408* (2011.01)

(56) References Cited

U.S. PATENT DOCUMENTS

| | | |
|---|---|---|
| 2002/0157034 A1* | 10/2002 | Sagar ............... H04H 20/10 |
| | | 714/4.1 |
| 2003/0028673 A1 | 2/2003 | Lin et al. |
| 2004/0098463 A1 | 5/2004 | Shen et al. |
| 2007/0055643 A1 | 3/2007 | Iwatsu et al. |
| 2008/0195698 A1 | 8/2008 | Stefanovic et al. |
| 2009/0077195 A1 | 3/2009 | Gibbs et al. |
| 2009/0125634 A1* | 5/2009 | Virdi ............... H04L 65/80 |
| | | 709/231 |
| 2010/0161756 A1 | 6/2010 | Lewis et al. |
| 2012/0110036 A1* | 5/2012 | Rabii ............... H04N 21/41407 |
| | | 707/822 |

OTHER PUBLICATIONS

Chinese Office Action issued by State Intellectual Property Office of China, dated Sep. 19, 2016, 22 pages.

* cited by examiner

METHODS, DEVICES AND COMPUTER PROGRAMS FOR TRANSMITTING OR FOR RECEIVING AND PLAYING MEDIA STREAMS

CROSS REFERENCE TO RELATED APPLICATION(S)

This application is a 35 U.S.C. §371 National Phase Entry Application from PCT/EP2011/066400 filed Sep. 21, 2011, the disclosure of which is incorporated by reference.

TECHNICAL FIELD

The present invention relates to methods for transmitting media streams, and to methods for receiving and playing media streams. The invention also relates to devices for transmitting media streams, to devices for receiving and playing media streams, and to computer programs comprising computer-understandable instructions configured, when executed on a device, to cause the device to carry out a method for transmitting media streams or a method for receiving and playing media streams. The invention may notably, although not limited to, be used in the fields of analogue and digital radio broadcasting and internet radio transmission and reception.

BACKGROUND

Radio broadcasting has been known since at least the 1920s. With the advent of the internet, many radio stations now transmit their programs as continuous digital media streams over the internet. These programs can therefore be listened to from anywhere on the earth through the internet.

Traditional over-the-air radio broadcasting may be affected by the radio transmission conditions, such as the weather conditions, the position of the receiver, and the surrounding. For instance, if a vehicle carrying a receiver enters a tunnel or an underground parking, the signal quality and strength may be affected or, worse, the reception may be erratic or even interrupted. These problems may also arise when receiving internet radio over a wireless connection.

Internet radio has also its own specific problems. Internet radio transmission usually implies a unicast transmission of a media stream (in the case of the internet, a stream of data packets), causing on the network a load which is proportional to the number of receiving points, i.e. proportional to the number of destination hosts. It may therefore be difficult to provide continued services to a number of users in situations where, for instance, in a traffic jam, many vehicles are each equipped with an internet radio receiver connected to the internet through the same access points.

It is desirable to improve the processes of transmitting, receiving and playing media streams, notably by improving the quality of the service without increasing, or at least without excessively increasing, the implementation and architecture complexity and the associated equipment costs.

SUMMARY

To meet or at least partially meet the above-mentioned goals, methods, devices and computer programs according to the invention are defined in the independent claims. Advantageous embodiments are defined in the dependent claims.

In one embodiment, a method is carried out by a receiving and playing device for receiving and playing a media stream. The method includes a first playing procedure, a playing mode switching procedure and a second playing procedure. The first playing procedure includes receiving a media stream through a communication medium or network and playing the received media stream. The playing mode switching procedure includes determining whether a media content about to be received or being received is locally stored and, if so, switching to the second playing procedure. The second playing procedure includes playing the media content based on at least the locally stored media content.

The method enables the receiving and playing device to replace or supplement the transmission of a media content, which forms part or which is expected to form part of a media stream transmitted over the communication medium or network, with a locally stored copy of the media content. In the case of over-the-air radio broadcasting, the method enables the receiving and playing device to use a locally stored version of the media content for improving the quality of the played media content or for at least temporarily carrying on the playing of the media stream, as if it was still properly received, when the signal reception has suddenly dropped (if, for instance, the vehicle carrying the receiver enters a tunnel or the like). In the case of unicast or multicast media streaming over the communication medium or network, the method may reduce the load on the communication medium or network as well as on the servers from which the media streams originate. Indeed, the method notably enables interrupting (i.e., pausing) the transmission of the media stream over the communication medium or network when a copy of the media content being streamed is locally stored. Thus, the service provided to the end users is improved and, at the same time, the load on the network is reduced.

Determining whether a copy of a media content about to be received or being received as part of the media stream (i.e., about to be streamed or being streamed) is locally stored may notably include (i) determining whether a copy of the media content is stored on the receiving and playing device, (ii) determining whether a copy of the media content is stored in the receiving and playing device's surrounding—for instance on a storage device arranged in the trunk (U.S.) or boot (U.K., Australia) of a car—, (iii) determining whether a copy of the media content is stored relative to the receiving and playing device in such a manner that the media content can be obtained in a more efficient manner than over the communication medium or network, or (iv) any combinations of the above-mentioned determining operations (i), (ii), and (iii).

The locally-stored media content is a copy of the media content about to be streamed or being streamed, although there may be, in some embodiments, differences between the streamed media content and the locally-stored media content, such as for instance differences in the quality of the media (e.g., quality of the sound, image resolution, etc.).

In one embodiment, the first playing procedure further includes detecting, in the received media stream or in data received along with the received media stream, an indicator indicating that a media content susceptible of being locally stored is about to be received or being received and, if so, starting the playing mode switching procedure.

In this embodiment, the receiving and playing device detects, during the first playing procedure, whether the media stream or data received along with the received media stream includes an indicator. The indicator may for instance be signalling information indicating or announcing that a new media content is about to be streamed. Other types of indicators may, however, be used, such as a transition in the characteristics of the media stream (change in the type of sound, etc). The indicator is used by the receiving and playing device for initiating the process of deciding whether the media content about to be streamed or being streamed is locally stored, to be able to replace or supplement the streamed media content with the locally stored media content. This embodiment therefore enables the receiving and playing device to make informed decisions as to when to initiate the playing mode switching procedure.

In one embodiment, the second playing procedure includes at least temporarily not receiving the media stream through the communication medium or network.

This reduces the load on the network, since, instead of continuously obtaining the media content as part of the media stream over the communication medium or network, a copy of the media content is obtained from a local storage medium and played accordingly. In other words, this embodiment saves network resources for obtaining and receiving the media stream at least during a period of time.

In one embodiment, the media stream includes at least one of an audio stream component and a video stream component.

In one embodiment, the communication medium or network includes a packet-switched network.

In one embodiment, the receiving and playing device is at least one of (i) an internet radio receiving and playing device, (ii) an internet protocol television, here abbreviated as IPTV, receiving and playing device, (iii) an in-vehicle receiving and playing device, (iv) a radio communication device, (v) a mobile phone, and (vi) a computer. The receiving and playing device may for instance be arranged in a vehicle, such as for instance a car, a bus, a truck, or a motorcycle. The receiving and playing device need not be mobile however.

In one embodiment, the first playing procedure further includes determining that a media content about to be received or being received is suitable for local replication; and storing the media content determined to be suitable for local replication on the receiving and playing device or on a storage device in the vicinity of the receiving and playing device.

This embodiment may for instance include determining that a media content is susceptible of being transmitted more than once as part of the media stream (i.e., susceptible of being streamed more than once), for instance because the media content is a piece of music which is frequently played, or, in contrast, determining that the media content about to be streamed is not suitable for being locally replicated, for instance because the media content is an extemporaneous voice segment supposed to be streamed only once. For instance, music pieces (songs, hits) may be suitable of local replication, while spoken words by a narrator, an announcer, a news anchor, or a deejay, i.e. by the person whose task is to read scripts and to make announcements on radio or television, may be less prone to being repeated.

A storage device in the vicinity of the receiving and playing device for storing a local copy of a media content may be any type of storage device accessible by, and/or connected to, the receiving and playing device in a more efficient manner than through the communication network or medium.

In one embodiment, the first playing procedure is such that determining that a media content about to be received or being received is suitable for local replication includes determining that the repetition frequency of the media content is larger than a threshold.

In this embodiment, the receiving and playing device may include a first playing procedure such that, upon receiving a media stream, it is determined how frequently a particular media content is sent. If it is determined that the same media content is streamed several times during a period of time, i.e. if its inclusion frequency is above a threshold, the media content is stored locally so that, the next time the media content is streamed, the locally stored copy of the media content may replace or supplement the streamed media content. This enables to reduce the load of the network and/or to improve the quality of the media content being played on the receiving and playing device.

In this embodiment, determining how frequently a particular media content is streamed from a radio station may include determining on how frequently the particular media content appears in the playlist of the radio station. The playlist of the radio station may be used to compile the list of media contents to be stored locally on the receiving and playing devices.

In one embodiment, the method further includes a receiving procedure including receiving at least one media content through the communication medium or network in advance of receiving the at least one media content as part of the media stream.

In this embodiment, a set of media contents may be transmitted to the receiving and playing device for storage thereon or for storage on a storage device in the vicinity of the receiving and playing device. This transmission is done in advance of the media contents being received by the receiving and playing device, i.e. in the advance of the media content being streamed or expected to be streamed. The set of media contents transmitted in advance may include the most played media contents, such as for instance all songs in "heavy rotation" for a particular radio station. Indeed, as part of an exemplary radio broadcast, for a particular station (e.g. radio station), a song may be played several times a week. The inventors have notably recognized that these repetitions could be used to reduce the load on the network and improve the user experience.

In this embodiment, the receiving procedure (to transmit the set of media contents in advance of the streaming) may be performed at a time when the load on the communication medium or network is less than a threshold or expected to be less than a threshold. The receiving procedure may for instance be performed at night, or when the receiving and playing device is in a cell where the load is relatively low. This may for instance correspond to a situation where there is no traffic congestion, i.e. generally outside drive time, i.e. neither during the morning drive time (7-10 am) nor during the afternoon drive time (3-6 pm).

In this embodiment, the receiving procedure may be such that the at least one media content that is received in advance is selected at least based on a playing profile associated with the receiving and playing device.

The playing profile associated with the receiving and playing device, or associated with the user using, at one point in time, the receiving and playing device, may include information as to the station (e.g. radio station) on which the receiving and playing device is usually tuned. It is advantageous to locally store the media contents that are most often played on the receiving and playing device. If a user of a receiving and playing device often listens to a radio station featuring jazz music, the pieces of music that should be locally stored are those played in this radio station, i.e. pieces of jazz music.

In one embodiment, the media content about to be received or being received is locally stored in an encrypted form; and the second playing procedure includes, before playing the media content, unlocking the locally stored media content using a digital key.

The digital key to unlock the locally stored media content may be transmitted as part of the media stream, before the scheduled media content is expected to be streamed, In this manner, the fact that media contents are locally stored on the receiving and playing device cannot be used by end users independently of when they are streamed. The intellectual property rights associated with the media contents may therefore be preserved. The digital key may be sent along with the indicator in the media stream or in data sent along with the media stream.

In one embodiment, a method is carried out by a transmitting device, for transmitting a media stream. The method includes transmitting, through a communication medium or network, a media stream for playing on at least one receiving and playing device; and transmitting, in the transmitted media stream or in data transmitted along with the transmitted media stream, an indicator indicating that a media content susceptible of being locally stored on the at least one receiving and playing device is about to be transmitted or being transmitted.

In this manner, thanks to the transmitted indicator, a receiving and playing device may conveniently decide when to check whether a scheduled media content (i.e., a media content about to be streamed, or being streamed) is locally stored, so as to timely make use the locally stored copy of the media content.

In this embodiment, transmitting, through the communication medium or network, the media stream may be carried out in a unicast or multicast manner.

In one embodiment, a receiving and playing device is arranged for receiving and playing a media stream. The receiving and playing device includes a first playing unit, a playing mode switching unit, and a second playing unit. The first playing unit is configured for receiving a media stream through a communication medium or network and for playing the received media stream. The playing mode switching unit is configured for determining whether a media content about to be received or being received is locally stored and, if so, for activating a second player. The second playing unit is configured for playing the media content based on at least the locally stored media content.

In one embodiment, a transmitting device is arranged for transmitting a media stream. The transmitting device includes a first transmitting unit and a second transmitting unit. The first transmitting unit is configured for transmitting, through a communication medium or network, a media stream for playing on at least one receiving and playing device. The second transmitting unit is configured for transmitting, in the transmitted media stream or in data transmitted along with the transmitted media stream, an indicator indicating that a media content susceptible of being locally stored on the at least one receiving and playing device is about to be transmitted or being transmitted.

The invention also relates to computer programs comprising computer-understandable instructions configured, when executed on a receiving and playing device, to cause the receiving and playing device to carry out a method according to any one of the above-described embodiments.

BRIEF DESCRIPTION OF THE DRAWINGS

Embodiments of the present invention shall now be described, in conjunction with the appended figures, in which:

FIG. 8 schematically illustrates a receiving and playing device in one embodiment of the invention;

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
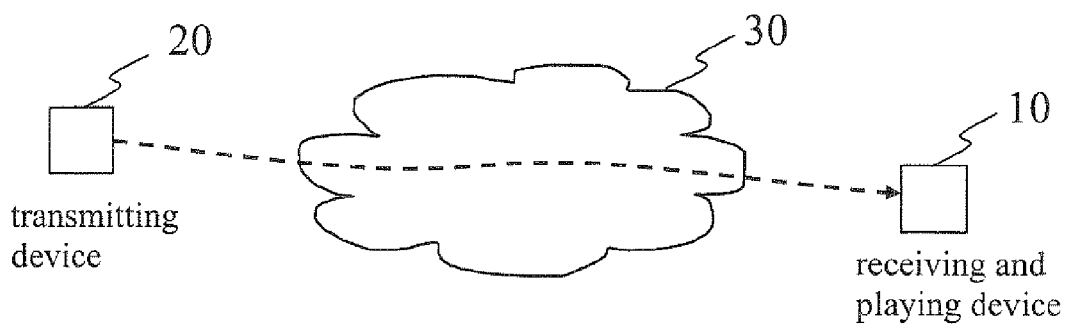
FIG. 1 schematically illustrates the context in which embodiments of the invention may be put into practice.

FIG. 1 schematically illustrates the context in which embodiments of the invention may be put into practice. A transmitting device 20 transmits a media stream (dotted arrow on FIG. 1) through a communication network 30 to a receiving and playing device 10. The communication network 30 may be the internet and may include wireless segments. The transmitting device 20 may be a server receiving data from a radio station (not illustrated). The media stream may include audio content continuously transmitted as a stream of data packets or as electromagnetic waves over the air.

Figure 2:
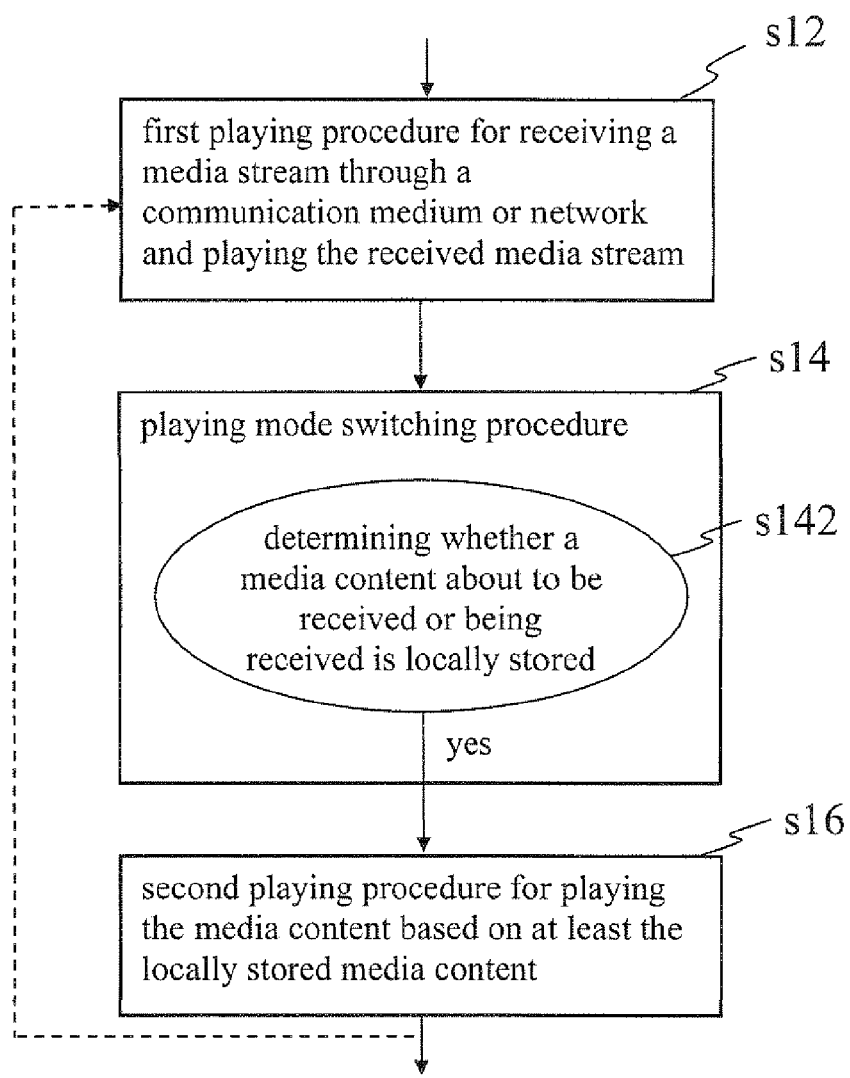
FIG. 2 is a flowchart of a method in one embodiment of the invention.

FIG. 2 is a flowchart of a method in one embodiment of the invention. The method includes a first playing procedure s12, a playing mode switching procedure s14, and a second playing procedure s16. The method is carried out by a receiving and playing device 10.

The first playing procedure s12 includes receiving a media stream through a communication medium or network 30 and playing the received media stream on the receiving and playing device 10. The media stream may be, but is not limited to, a 32 kB/s to 320 kB/s stream of data packets, such as for instance Internet Protocol (IP) packets.

The playing mode switching procedure s14 includes determining s142 whether a media content about to be received or being received as part of the media stream (i.e., about to be streamed or being streamed) is locally stored on the receiving and playing device 10 or in the vicinity of the receiving and playing device 10.

If so ("yes" following step s142), i.e. if it is determined s142 that the media content about to be received or being received as part of the media stream is locally stored, the second playing procedure s16 is initiated. The second playing procedure s16 includes playing the media content based on at least the locally stored media content. This may include pausing, i.e. interrupting, the reception of the media stream and playing instead the locally stored media content.

The first playing procedure s12 and the playing mode switching procedure s14 may be carried out simultaneously. When the second playing procedure s16 is initiated, the receiving and playing device 10 is switched from a mode in which the first playing procedure s12 is carried out to a mode in which the second playing procedure s16 is carried out.

The second playing procedure s16 may include playing the media content based at the same time on the media stream received through the communication medium or network 30 and on the locally stored copy of the media content. The second playing procedure s16 may also include playing the media content based only on the locally stored media content, during a period of time.

After the second playing procedure s16 has been performed, the method may return to the first playing procedure s12 (dotted arrow on FIG. 2 to block s12).

Figure 3:
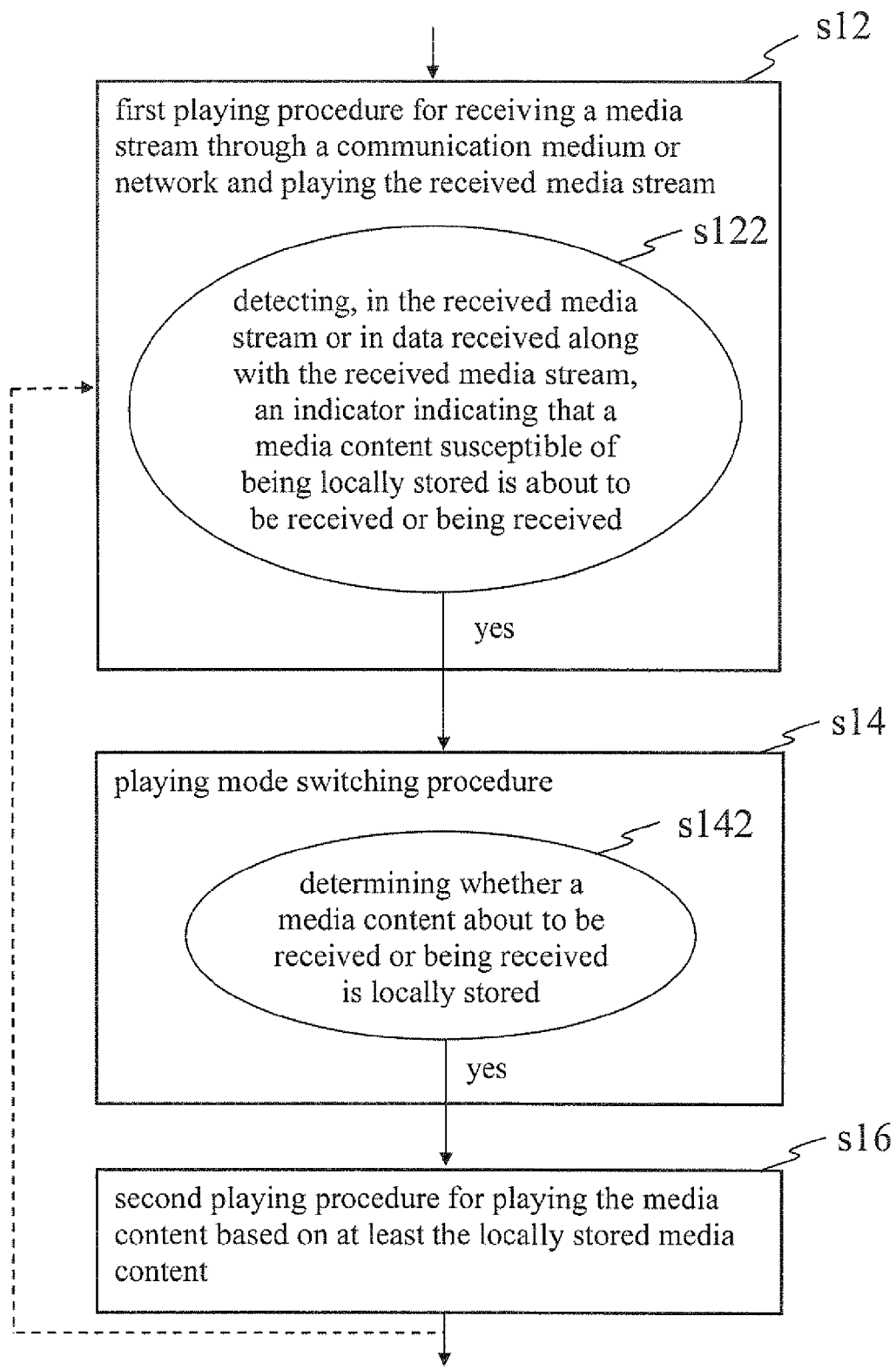
FIG. 3 is a flowchart of a method in one embodiment of the invention, including, in a first playing procedure, a step of detecting, in the received media stream or in data received along with the received media stream, an indicator indicating a media content susceptible of being locally stored.

FIG. 3 is a flowchart of a method in one embodiment of the invention. Compared to the method illustrated in FIG. 2, the method illustrated in FIG. 3 includes, in the first playing procedure s12, a step of detecting s122, in the received media stream or in data received along with the received media stream, an indicator indicating that a media content susceptible of being locally stored is about to be received or being received on the receiving and playing device 10. If so ("yes" following step s122), i.e. if an indicator is detected in the received media stream or in data received along with the received media stream, the playing mode switching procedure s14 is initiated. The first playing procedure s12 may be continued when the playing mode switching procedure s14 is carried out. The remaining steps are as described above with reference to FIG. 2.

Figure 4:
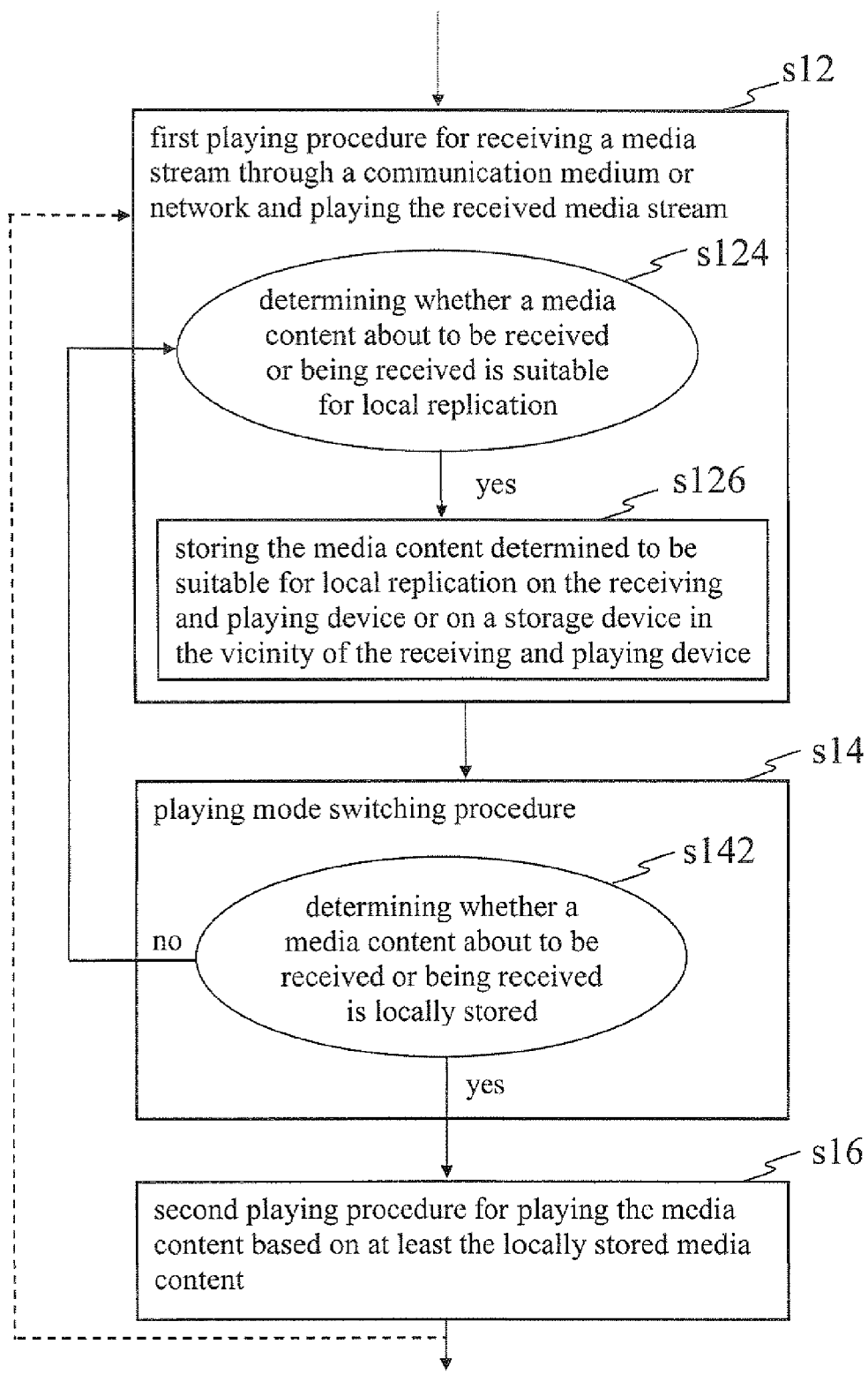
FIG. 4 is a flowchart of a first playing procedure in a method in one embodiment of the invention.

FIG. 4 schematically illustrates a method in one embodiment of the invention. In that method, a step of determining s124 whether a media content about to be received or being received is suitable for local replication is carried out during the first playing procedure s12. This step s124 may be carried out only after determining s142 in the playing switching procedure s14 that a media content about to be received or being received is not locally stored ("no" following step s124). If it is determined that the media content about to be received or being received is suitable for focal replication, the media content is stored s126 on the receiving and playing device 10 or on a storage device in the vicinity of the receiving and playing device 10. Therefore, the next time the receiving and playing device 10 determines that the media content is about to be streamed, the locally stored copy of the media content can be used to play the media content on the receiving and playing device 10. The remaining steps are as described above with reference to FIG. 2.

Figure 5:
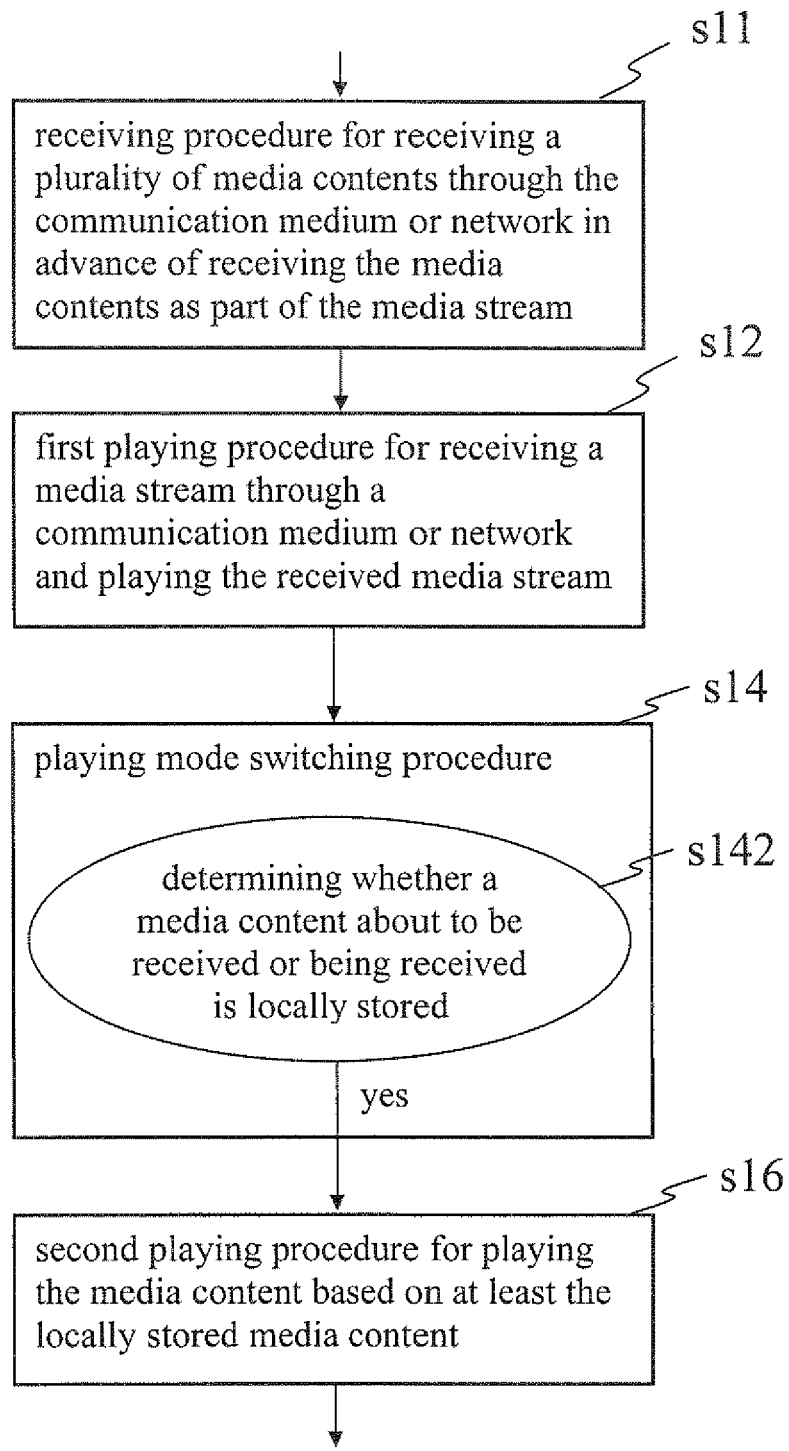
FIG. 5 is a flowchart of a method in one embodiment of the invention, including a receiving procedure for receiving a plurality of media contents in advance.

FIG. 5 is a flowchart of a method in one embodiment of the invention. Compared to the method illustrated in FIG. 2, the method further includes a receiving procedure s11. The receiving procedure s11 includes receiving a plurality of media contents through the communication medium or network 30 in advance of receiving the media contents (in step s12) as part of the media stream. The remaining steps are as described above with reference to FIG. 2. In addition, determining whether a media content about to be received or being received is locally stored (step s124) may include obtaining identification information (such as an indicator) identifying the media content and checking, based on the obtained identification information, whether the media content has been previously received as part of the receiving procedure s11.

Figure 6:
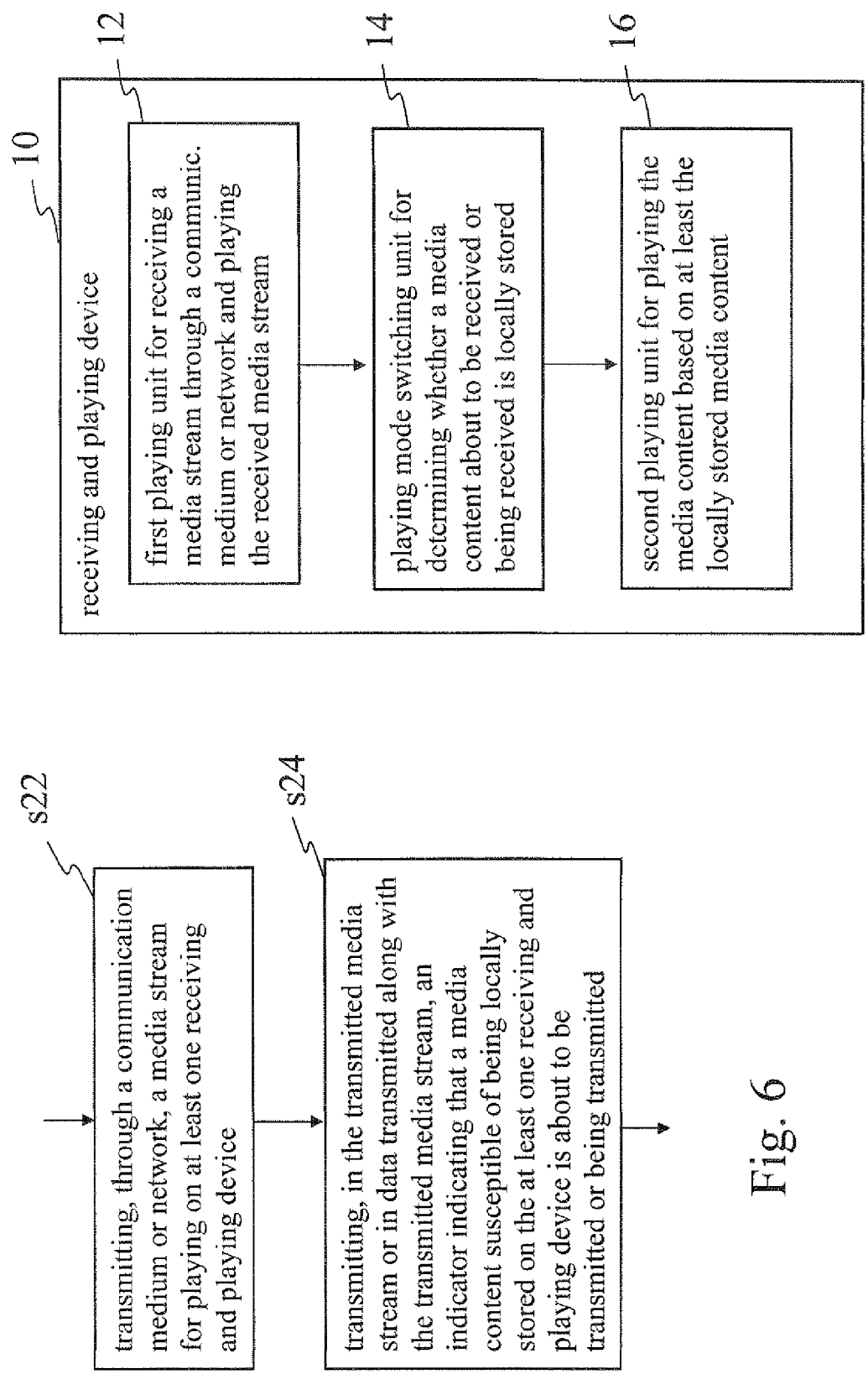
FIG. 6 is a flowchart of a method, carried out by a transmitting device, in one embodiment of the invention.

FIG. 6 is a flowchart of a method in one embodiment of the invention. The method is carried out by a transmitting device 20. The method includes transmitting s22, through a communication medium or network 30, a media stream for playing on at least one receiving and playing device 10. The method also includes transmitting s24, in the transmitted media stream or in data transmitted along with the transmitted media stream, an indicator indicating that a media content susceptible of being locally stored on the at least one receiving and playing device 10 is about to be transmitted or being transmitted. Step s24 may be performed simultaneously to step s22.

Figure 7:
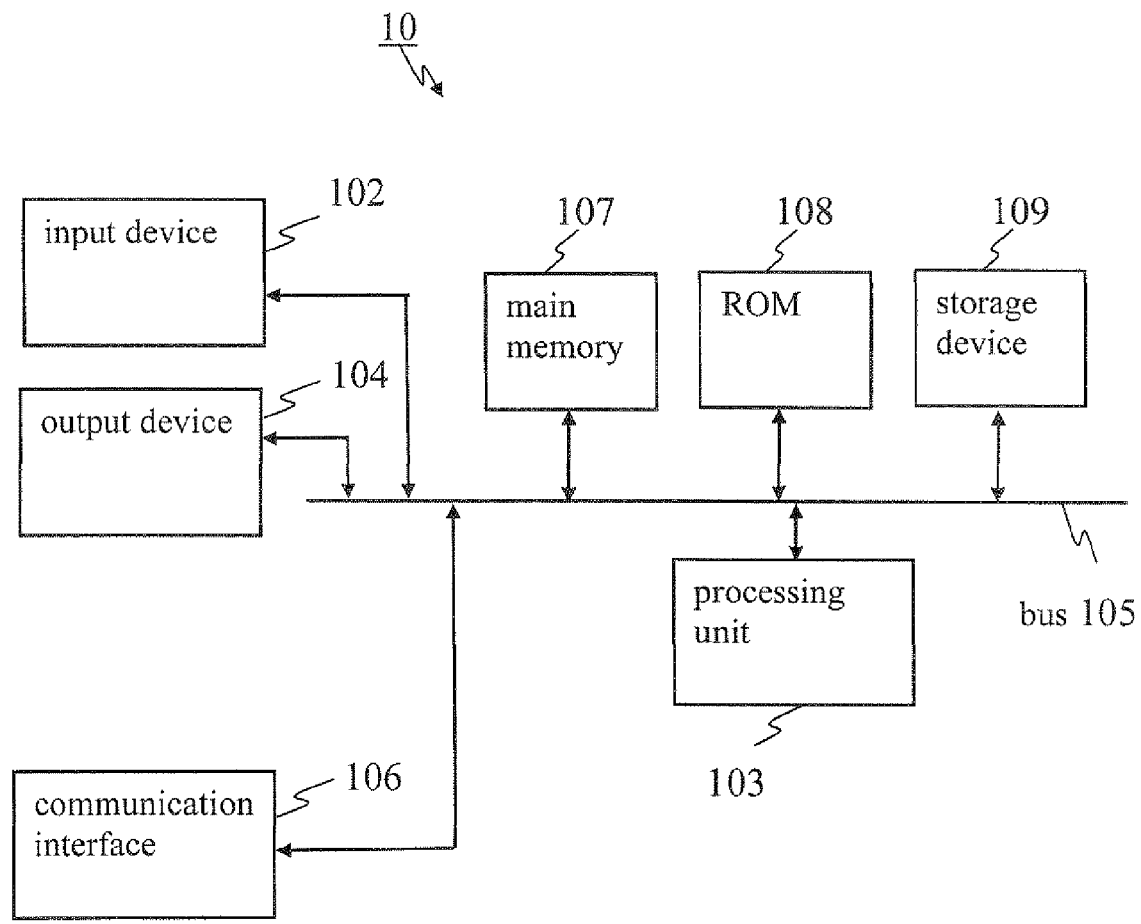
FIG. 7 schematically illustrates an exemplary structure of a receiving and playing device that may be used in some embodiments of the invention.

FIG. 7 is a schematic diagram of an exemplary implementation of a receiving and playing device 10 which may be used in embodiments of the invention. As illustrated, receiving and playing device 10 may include a bus 105, a processing unit 103, a main memory 107, a ROM 108, a storage device 109, an input device 102, an output device 104, and a communication interface 106. Bus 105 may include a path that permits communication among the components of receiving and playing device 10.

Processing unit 103 may include a processor, a microprocessor, or processing logic that may interpret and execute instructions. Main memory 107 may include a RAM or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator, or more generally a user, to input information to receiving and playing device 10, such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables receiving and playing device 10 to communicate with other devices and/or systems. For example, communication interface 106 may include mechanisms for communicating with another device or system via a network, such as communication network 30.

Receiving and playing device 10 may perform certain operations or processes described herein. Receiving and playing device 10 may perform these operations in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein. Alternatively, hardwired circuitry may be used in place of or in combination with software instructions to implement processes and/or operations described herein. Thus, implementations described herein are not limited to any specific combination of hardware and software.

FIG. 8 schematically illustrates a receiving and playing device 10 in one embodiment of the invention. The receiving and playing device 10 includes a first playing unit 12, a playing mode switching unit 14, and a second playing unit 16. The first playing unit 12 is configured for receiving a media stream through a communication medium or network 30 and playing the received media stream on the receiving and playing device 10. The playing mode switching unit 14 is configured for determining whether a media content about to be received or being received is locally stored, i.e. cached, on the receiving and playing device 10 or on a storage device in the vicinity of the receiving and playing device 10. The second playing unit 16 is configured for playing the media content based on at least the locally stored media content. The arrows on FIG. 8 illustrate some of the connections that may exist between the illustrated units. However, other connections may also exist, for instance directly between the second playing unit 16 and the first playing unit 12.

Figure 9A:
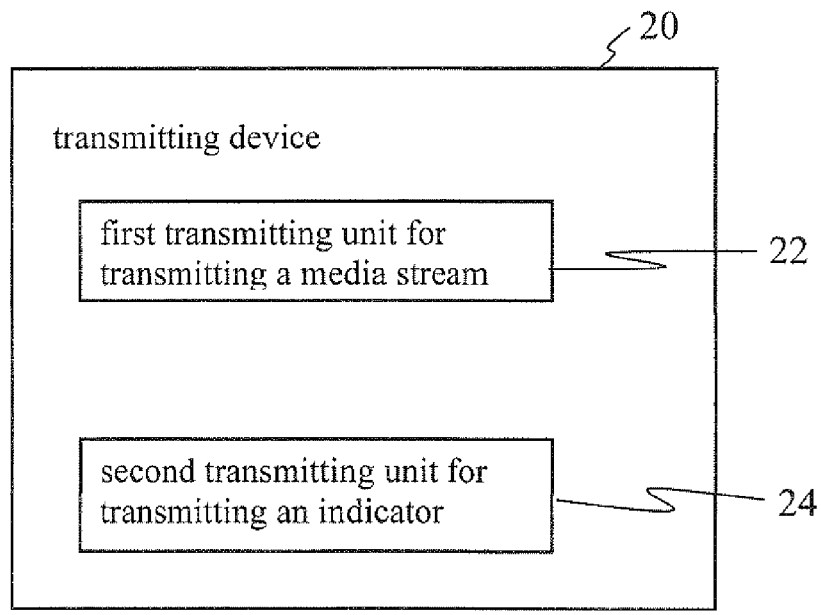
FIG. 9a schematically illustrates a transmitting device in one embodiment of the invention.
Figure 9:
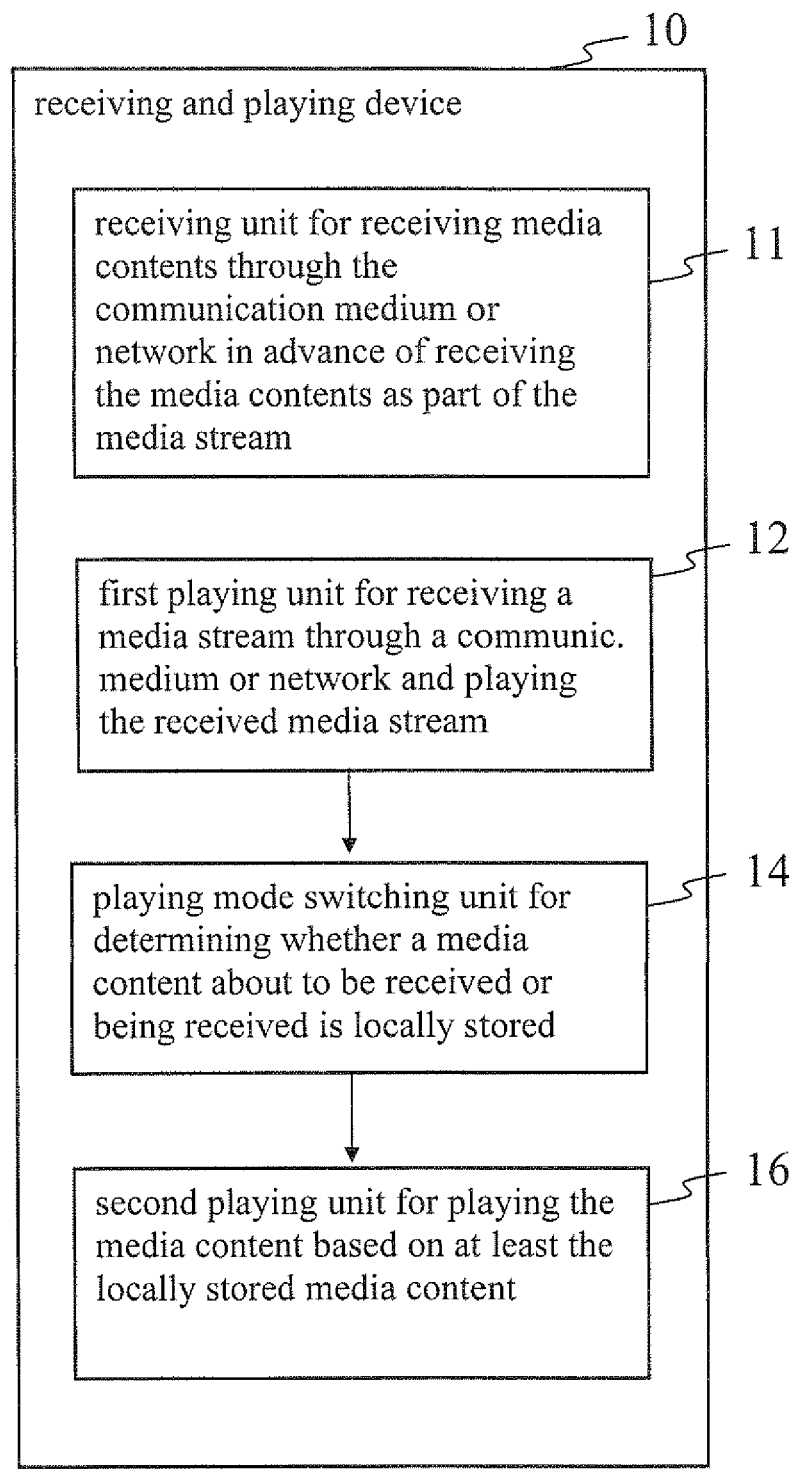
FIG. 9 schematically illustrates a receiving and playing device in one embodiment of the invention, the device including a receiving unit for receiving media contents in advance of being scheduled on the media stream.

FIG. 9 schematically illustrates a receiving and playing device 10 in one embodiment of the invention, which differs from the receiving and playing device 10 illustrated in FIG. 8 in that the device 10 illustrated in FIG. 9 additionally includes a receiving unit 11. This receiving unit 11 is configured for receiving media contents through the communication medium or network 30 in advance of receiving the media contents as part of the media stream.

FIG. 9a schematically illustrates a transmitting device 20 in one embodiment of the invention. The transmitting device 20 includes a first transmitting unit 22 for transmitting, through a communication medium or network 30, a media stream for playing on one or more receiving and playing devices 10. The transmitting device 20 also includes a second transmitting unit 24 for transmitting an indicator to announce the streaming of a media content susceptible of being locally stored. The indicator may include an identification of the media content about to be streamed or being streamed.

In some embodiments of the invention, a reduction of 50 to 90 percent of mobile data traffic for internet radio streaming and similar applications may be obtained. The media contents that are played by radio stations (or other original sources) with a considerable repetition frequency are served locally from the receiving and playing device 10.

In these embodiments, a detection and decision process may be performed to detect and decide which parts of the streamed content are suitable for local replication.

In these embodiments, a detection and decision process may also be performed to detect and decide whether particular content items, i.e. media contents, (music titles, clips etc., anything that is not "live") can be pushed as bulk data onto the receiving and playing device 10 prior to being streamed by the original content source. This may for instance be performed by calculating the frequency of items to be played, and thereby being able to choose the optimal items to cache locally.

Furthermore, in these embodiments, a synchronization of the streamed media content and the local copy may be performed when it is played.

Yet furthermore, in these embodiments, security measures may be used to allow playing of local media content only when it is being streamed by the original source (and holder of the rights) at the same time.

To narrow down the set of titles, i.e. the set of media contents, to be stored locally, it is useful to create a listening (or viewing—, in case of other media types) profile of the user (operating the receiving and playing device 10). This may be achieved in two ways as presented below, under (A) and (B).

(A) In one embodiment, if the playlist of the radio station is known (which is usually the case, assuming a collaboration with the radio stations), the frequency an item (i.e., a media content) is played for a particular user is calculated by multiplying the frequency at which the item (i.e., a media content) appears in the playlist of a certain station with the fraction of time the user tunes to that radio station. Thus, all the items (i.e., the media contents) may be ordered a priori by their playing frequency for an upcoming period of time (e.g. the program of the station is set one week ahead). Then, the most frequent songs that the user is expected to listen to may be cached (up to the size of the local cache on the receiving and playing device 10). Furthermore, since unicast connections are generally used for internet radio, the end user or the receiving and playing device 10, respectively, may be identified, so that a listening profile can be created on a per-user-basis. Creating the listening profile may either be made on the client side (every client does the monitoring by itself and instructs either the push caching from the server or the local runtime recording at the client side) or on the server side.

(B) In one embodiment, if the playlist of the radio station is not known, then the frequency of the played items (i.e., played media contents) may be built at runtime. The disadvantage is that it may take a certain time until the play frequency of the items (i.e., media contents) is correctly assessed, so the caching may possibly not be as efficient as in case (A). However, since no collaboration with the radio stations is needed, the embodiment may be more flexible.

For populating the local cache with the media contents, the client (i.e., the receiving and playing device 10) may connect to a server at advantageous time points, such as for instance at low network usage times (such as at night), or when visiting a lesser loaded cell, so as to regularly refresh the local cache with the most popular songs or clips (i.e., the most popular media contents). This is particularly adapted for case (A) presented above, when the media content frequency is known a priori. Moreover, this caching method allows the caching of media content versions with higher quality level that the one used at broadcasting time, thus providing a higher service value. Furthermore, the creation of this pool may be done on a per client basis (additionally or as an alternative). In this case, each media content which is received from an audio stream may be recorded locally. In both cases, the least-played media contents may be deleted when the storage capacity reaches its limit.

On the server side, a content information service entity may announce, for instance using a suitable indicator, which parts of the streamed content is suitable for local storage and playout. This content information service entity may be part of the "Web Server" entity schematically illustrated on the right-hand side of FIG. 10 (on the right side of the dotted line). In the case of an FM radio program, for example, live interviews or the presentation of the anchorman should not be stored locally. Any music title, comedy clip or news (at least for a limited period of time) on the other hand, is eligible to be stored on the receiving and playing device 10. The content information service entity signals to the clients (i.e., the receiving and playing devices 10) currently connected that media content suitable to be played out locally is about to be aired. This may happen right before the media content is played or some time in advance or even when the media content has already started. The playlist of radio shows is usually fixed in advance, so that the whole set of media contents to be played in the next hour or so could be announced.

On the client side (left side of FIG. 10, for instance), the normal mode of operation of a receiving and playing device 10 is that it receives the data stream (i.e. the media stream). When a signal is received that a media content suitable to be played out locally is about to be streamed, the receiving and playing device 10 checks whether this content item is present in the local storage, illustrated by the "Local Content Info" part on the client side in FIG. 10, If yes, the receiving and playing device 10 plays the local version instead of the stream and pauses the stream for the duration of the media content. The locally played media content is synchronized with the aired content (e.g. by connecting to the content information service entity, which obtains the starting time of each media content item and makes it available) and, when finished, the live media stream is resumed. The starting time of a media content item can be detected e.g. by detecting pauses or a change in certain characteristics of the frequency spectrum; there are tools existing that can perform this kind of detection, like for instance "Streamripper" (see Phil Kerr, "The Linux MP3-HOWTO", v1.61, 2001-12-16, section 7.7 "Stream Grabbers", http://www.ibiblio.orgipub/Linuxidocs/HOWTO/other-formats/htinl_single/MP3-HOWTO,html, consulted on Sep. 17, 2011).

In one embodiment, a media content which is locally stored on the receiving and playing device 10 should only be played if it is receivable via an audio stream at the same time. In case the receiving and playing device 10 can be tampered with, the cached content could be locked or scrambled and can only be unlocked or descrambled when the appropriate key is received from the network side (e.g. via the content information service entity presented above). The risk of tampering may be low in the case of an internet radio receiver embedded in a car, because car manufacturers have strong control over the embedded devices. Encryption may therefore be unnecessary in some embodiments.

Now turning to FIGS. 10 to 13, some embodiments of the invention will be described in more detail. In FIGS. 10 to 13, the arrows without numbering represent activities that may be executed continuously.

Figure 10:
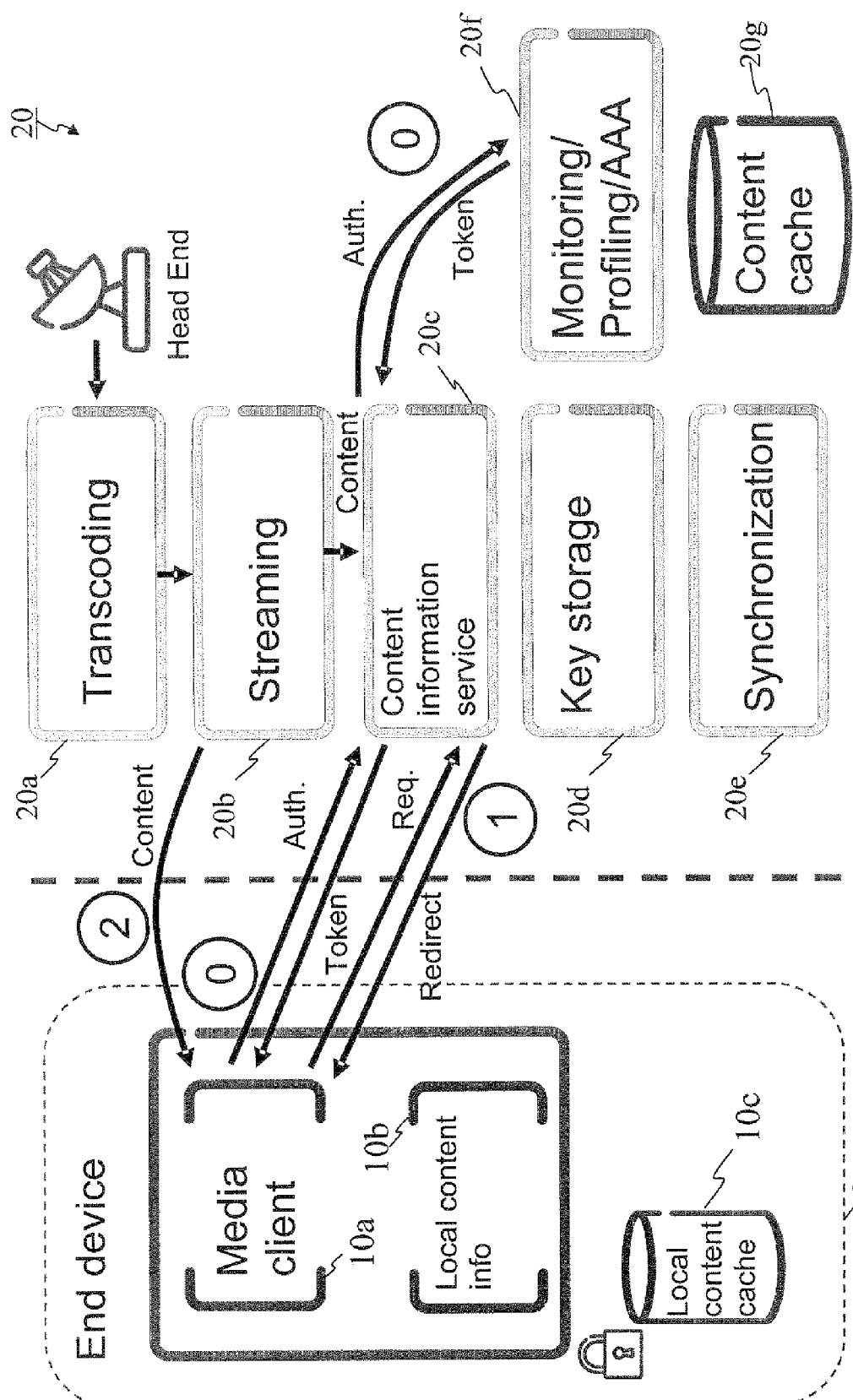
FIG. 10 schematically illustrates a process wherein an end user device registers to obtain a media stream in one embodiment of the invention.
Figure 11:
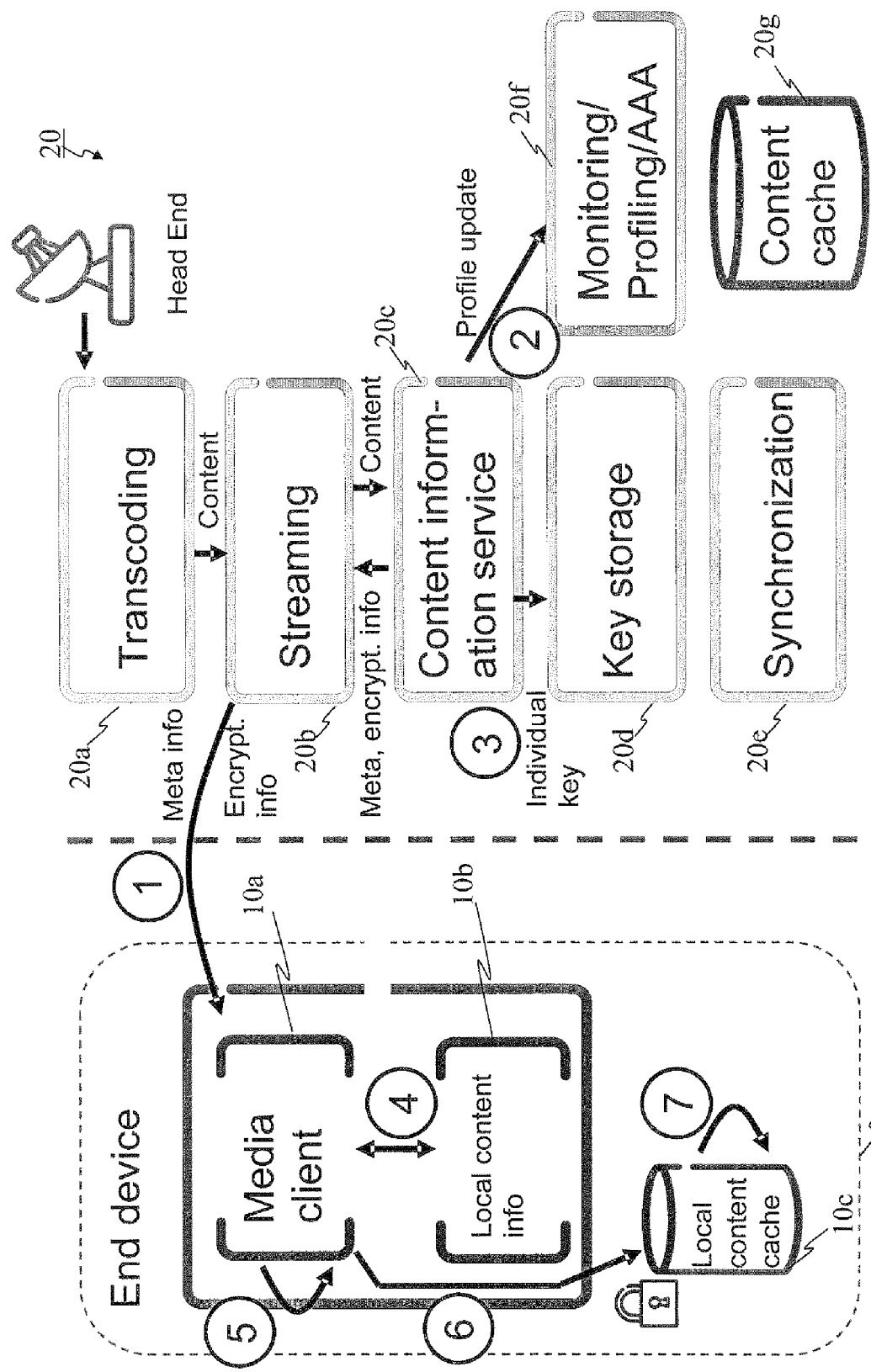
FIG. 11 schematically illustrates a process wherein media content about to be played is detected as suitable for local storage, in one embodiment of the invention.
Figure 12:
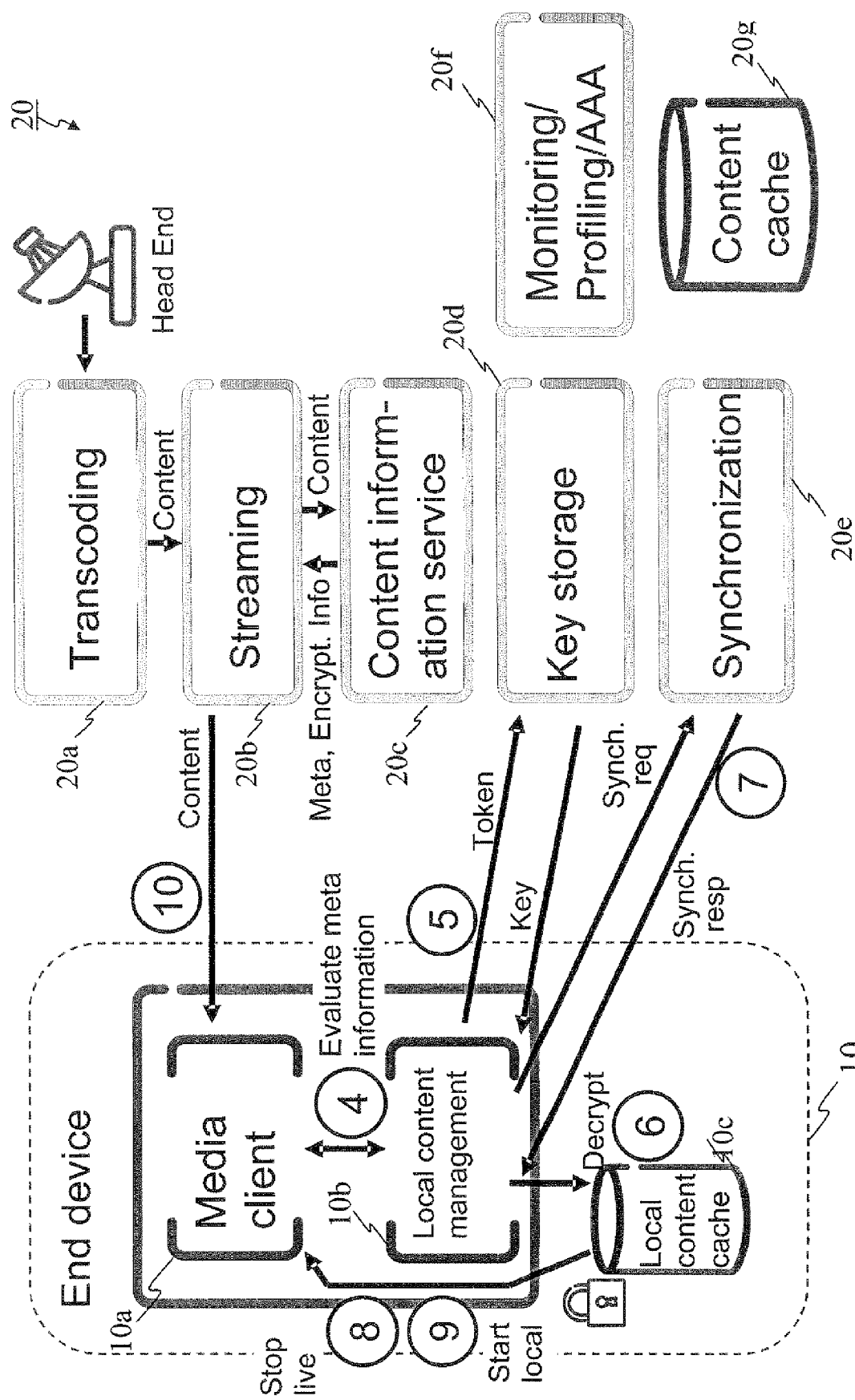
FIG. 12 schematically illustrates a process wherein a local copy of a media content about to be played is found, in one embodiment of the invention.
Figure 13:
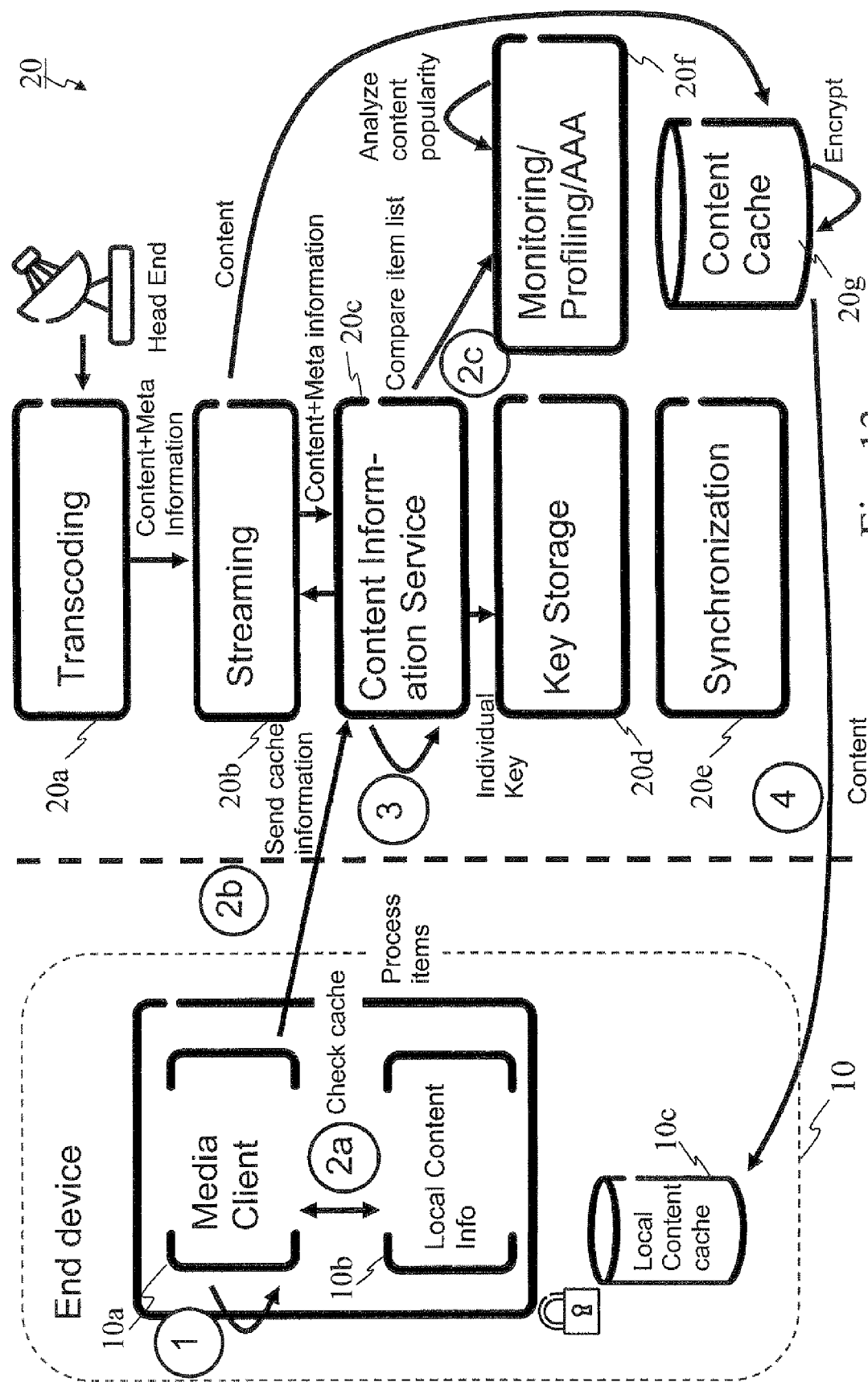
FIG. 13 schematically illustrates a process of content provisioning, in one embodiment of the invention.

FIG. 10 schematically illustrates a receiving and playing device 10 ("End device") including a media client function ("Media client") 10a and local content information ("Local content info") 10b identifying which media content is locally stored in a local content cache ("Local content cache") 10c. The local content info 10b is also called local content management 10b in FIG. 12. FIG. 10 also schematically illustrates, on the right-hand side of the vertical dotted line, functions performed on the server side, namely a transcoding function 20a, a streaming function 20b, a content information service function 20c, a key storage function 20d, a synchronization function 20e, a monitoring/profiling/ AAA function 20f (wherein "AAA" stands for Authentication, Authorization and Accounting), and a content cache 20g. The illustrated head end is a point in the content delivery architecture where content gets injected into the network. It is illustrated in FIG. 10 (as well as in FIGS. 11-13) as a satellite receiver, although the content can be fed by any content source.

When a receiving and playing device 10 requests streaming content for the first time, the receiving and playing device 10 registers at an authentication server with a unique identifier (arrow labelled "Auth." from media client 10a to content information service 20c and arrow labelled "Auth" also from content information service 20c to monitoring/profiling/AAA 20f, wherein "Auth." refers to authentication). The authentication server (for instance as part of the monitoring/profiling/AAA 20f) sends a token to the receiving and playing device 10 (arrows labelled "Token" from the monitoring/profiling/AAA 20f to the content information device 20c and to the media client 10a), so that it can authenticate itself in the future every time it requests the streaming service (Step 0 in FIG. 10).

Streaming content is then delivered upon an initial request by the user (arrow labelled "Req.", referring to "request", from media client 10a to content information service 20c). The request is sent to the Web portal (for instance the content information service 20c), where the receiving and playing device 10 is authenticated, based on the token sent with the request. The live stream is started and is played on the receiving and playing device 10 (Steps 1, 2 in FIG. 10). The stream might not play exclusively for this receiving and playing device 10, i.e. it can be received also by other devices (e.g. it could be a multicast stream).

When the content information service entity 20c on the network side detects that the content about to be played is suitable for local storage (i.e. it is not live talk and the end device request was received before a title had started), the following happens on the network side (compare steps 1-7 in FIG. 11):

Step 1: Meta information and encryption information is sent along with the stream (title, interpreter, . . . ), as schematically illustrated by the arrow labelled "Meta info, Encrypt. info" from streaming function 20b to media client 10a.

Step 2: The user profiling database is updated with content information (title, interpreter, date and time of day, . . . ), as illustrated by the arrow labelled "Profile update" from content information service 20c to monitoring/profiling AAA 20f.

Step 3: When the title is completed, an individual key for this content item and this user is generated and stored in the key storage 20d on the network side—unless there is already an entry for this particular content item. In the case several users receive the same stream, the same key may be generated for the entire group.

Step 4: At the same time (as step 3) on the client side, it is checked whether the current content item is available locally. Therefore, the meta information sent along with the stream is evaluated. Checking whether the content item is available locally is schematically illustrated by the arrow from the media client 10a to the local content info 10b.

If the media content is new, the following may happen on the client side:

Step 5: The play out of the media content continues, based on the received media stream.

Step 6: If the local cache 10c is not full, the content is recorded on the local cache 10c. If the local cache is full but the play frequency of the new content item (as notified by the content information service entity 20c, or as computed locally) is higher than the play frequency of local stored item(s), then this(these) item(s) are deleted and the new content is stored locally.

Step 7: Using the encryption information sent along with the stream for this content item, the content is encrypted.

If a local match of this media content item is found, the following happens (referring to steps 5-10 in FIG. 12):

Step 5: The client identifies itself and queries the key storage entity on the network side for a key to unlock the content item (as illustrated by the arrow labelled "Token" from local content management 10b to key storage function 20d and arrow labelled "Key" from key storage function 20d to local content management 10b).

Step 6: Upon reception of the decryption key, the local content item is decrypted; the policy for the decryption key may be such that it is only valid for one time decryption, if the song is played again a new key is required (as illustrated by the arrow labelled "Decrypt" between the local content management function 10b and the local content cache 10c).

Step 7: The local media content item is synchronized for playout with the live stream, e.g. by querying a network side server that provides a timestamp of the beginning of the streamed title (as illustrated by the arrow labelled "Synch. req", referring to "Synchronisation request", from the local content management function 10b to the synchronisation function 20e and the arrow labelled "Synch. resp", referring to "Synchronisation response" in the other direction).

Step 8: The play out of the live stream is stopped, i.e. interrupted or paused.

Step 9: The local media content item is played out starting at the point in time where the live stream was stopped.

Step 10: When the title is finished, the live stream is resumed again (as illustrated by the arrow labelled "Content" from the streaming function 20b to the media client 10a).

Alternatively, the content may be provided as follows, in one embodiment of the invention. It has been explained above how relevant new media content is recorded locally the first time it is played. However, this process may be improved further. Out of the history the profiler knows to which radio station the user device usually tunes in (the average user only tunes in to a couple of stations). Also usually the song playlist and their rotation is known in advance for radio stations (e.g. for the entire week). Thus for each song an expected play frequency can be calculated a-priori. This can be used for opportunistically pre-cache content on the receiving and playing device 10 or in the vicinity thereof.

For example, it can be assumed that a car equipped with an internet radio device can connect to the home WLAN through a WIFI interface while parked in the garage overnight. During that time, the play content for the next days may be analyzed against the local content cache 10c and the cache 10c may be updated with the media content items that are expected to be the most frequently played.

Another example is when the car is parked somewhere during off-peak communication hours. If the local cell is reasonably underloaded (as decided by the network operator), there is a good opportunity to update the local cache at little cost. In this case, the pre-caching of an item in one embodiment is carried out only if the expected play frequency is with some measure >1, as larger than one (i.e., >1), as it is undesirable to transfer items that have a low probability to be played even if there is enough cache memory free.

The following steps are taken for the alternative content provisioning (see FIG. 13):

Step 1: User device (i.e. end device 10 or receiving and playing device 10) checks periodically if there is a possibility to perform the alternative content provisioning, i.e. the device 10 can connect to the server side via a relatively free (local fixed network or WIFI network) or low cost (a underloaded radio cell under special agreement with the network operator) channel. If so step 2 is carried out.

Step 2: The information in the profiler 20f is compared with a list of items on the server side that will be played during the next period (The period is a number of d days starting immediately for which the caching is done). This information is sent along with the content ("Meta Information" in FIG. 13). If the logged information in the profiler 20f is not up to date, steps 2a and 2b are performed, i.e. the latest device cache information (e.g. "fill level") is sent to the Content Information Service 20c. All the media content items on the server side that have an expected play frequency >x are considered for pre-caching (x depends on the cost of caching vs. cost of not caching. E.g. most likely if the connection is WIFI x=0, if the connection is via a telco network x>1). This list is ordered by falling play frequency.

Step 3: Each media content item in the considered update list is processed. If local cache is not full it will be marked for download. If cache memory is full, but the play frequency of the item is higher than of local stored item(s), then this (these) item(s) are deleted and the new content is marked for download. The occupancy of the cache is updated accordingly.

Step 4: Each marked item is downloaded on the user device 10 (ordered by falling play frequency). Each item is encrypted before the download and the corresponding generated key is stored in the key storage on the network side. Either all marked content is pre-cached or, if the process is interrupted it can be safely restarted from step 1 at the next opportunity.

Some of the advantages of embodiments of the invention are therefore as follows:

Drastic reduction of over-the-air-traffic for audio streaming applications;

Reduction of server load for audio streaming applications; and

More robust user experience (in the case of car infotainment, e.g. continued service while passing a tunnel).

In one embodiment, a streamed media content may be interrupted before its actual end by a narrator or by a next media content (this technique being known as a crossfade) and this may be dealt with as follows. If the content source (radio station) and the client station do not collaborate, the receiving and playing device 10 may be configured to fade out the locally-stored media content in advance of the end of the media content (such as for instance 10 seconds before the end of the media content) to make sure an early interruption of the media content is captured in the then received media stream. If the content source (radio station) and the client station (receiving and playing device 10) collaborate, one connection may be provided for the content and another connection is provided for signalling, including to signal the end of a media content.

Where the terms "first playing unit", "second playing unit", "playing mode switching unit" and "receiving unit", etc. are used herewith, no restriction is made regarding how distributed these elements may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned and/or claimed first playing unit, second playing unit, playing mode switching unit and receiving unit, etc. is replaced by first playing means, second playing means, playing mode switching means and receiving means, etc. respectively, or by a first player, second player, playing mode switcher and receiver, etc. respectively, for performing the functions of the first playing unit, second playing unit, playing mode switching unit and receiving unit, etc.

In further embodiments of the invention, any one of the above-described procedures or steps may be implemented using computer-readable instructions, for example in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

Aspects of the above-disclosed embodiments may be implemented in the context of so-called virtual radio channels, wherein a user registers with a streaming service, the user defines/creates a profile (i.e., the kind/types of media contents or pieces of music the user likes or dislikes, e.g. the user may like singer "Madonna" or music band "Simply Red"), and the user receives, on his/her receiving and playing device, a user-specific media stream (namely, when the user starts to play music, a title that presumably matches the user's taste is played; the user can then rate the title in order to fine-tune his/her listening profile). One such a streaming service is last.fm. However, last.fm is only one example, there are several similar services on the Internet.

In particular, in the context of virtual radio channels, when a user requests the service (such as for instance the last.fm service) and wants music (or, more generally, media contents) to be played, users with similar profiles get the same content pushed to their devices, even when they are currently not interested in listening at all (let's call them passive users). This may be implemented for instance by multicasting targetting all the reachable destination nodes (active or passive) sharing or partially sharing user profiles (i.e., for instance with similar user profiles). When such a passive user at a later point in time requests music (or, more generally, media contents), a check is made how loaded the radio cell is. If the load is low, an appropriate song or media content is streamed to his/her device. If the load is high (or something else hinders good reception, e.g. a tunnel), the media content that has earlier been pushed to his/her device is played (i.e., a substitute media content is played, it is not necessarily the same media content as streamed but still complies with the user's profile). The user experience shall be the same: a title is being played that matches the taste of the user.

The invention claimed is:

1. A method carried out by a client device, for receiving and playing a media stream, the method comprising:
    performing a first playing procedure, wherein the first playing procedure comprises:
        transmitting, by the client device to a content server, a request related to a media content item;
        receiving, at the client device, meta-information transmitted by the content server, the meta-information related to the media content item and comprising an indicator indicating that the media content item is susceptible of being locally stored and a media identifier for identifying the media content item, wherein the indicator and the media identifier are separate and distinct;
        detecting, in the meta-information, the indicator indicating that the media content item is susceptible of being locally stored; and
        as a consequence of detecting the indicator, performing a second playing procedure, wherein
    the second playing procedure comprises:
        determining, based on the media identifier included in the meta-information, whether there exists in a local storage a locally stored media content item corresponding to media content item identified by the media identifier; and
        as a consequence of determining that there exists in the local storage the locally stored media content item, playing the media content item based on at least the locally stored media content item.

2. The method of claim 1, wherein, playing the media content item based on at least the locally stored media content item comprises: obtaining, from a network side server, a timestamp indicating the starting time of the media content; and playing the media content item based on at least the locally stored media content item, starting at the obtained timestamp or continuing to play the media content item as if the locally stored media content item started at the obtained timestamp.

3. The method of claim 1, wherein the second playing procedure further comprises at least temporarily not receiving the media stream.

4. The method according to claim 1, wherein the media stream includes at least one of an audio stream component and a video stream component.

5. The method according to claim 1, wherein the client device is at least one of:
    an internet radio receiving and playing device,
    an internet protocol television, here abbreviated as IPTV, receiving and playing device,
    an in-vehicle receiving and playing device,
    a radio communication device,
    a mobile phone, and
    a computer.

6. The method according to claim 1, wherein the first playing procedure further includes:
    determining that a media content about to be received or being received is suitable for local replication; and
    storing the media content determined to be suitable for local replication on the client device or on a storage device in the vicinity of the client device.

7. The method according to claim 6, wherein the first playing procedure is such that determining that a media content about to be received or being received is suitable for local replication includes determining that a repetition frequency of the media content is larger than a threshold.

8. The method according to claim 1, further comprising performing a receiving procedure that comprises receiving at least one media content through a communication medium or network in advance of receiving the at least one media content as part of the media stream.

9. The method according to claim 8, wherein the receiving procedure is performed at a time when a load on the communication medium or network is less than a threshold or expected to be less than a threshold.

10. The method according to claim 8, wherein the receiving procedure is such that the at least one media content that is received in advance is selected at least based on a playing profile associated with the client device.

11. The method according to claim 1, wherein
the second playing procedure includes, before playing the media content item, unlocking the locally stored media content item using a digital key.

12. A method, carried out by a transmitting device, for transmitting a media stream, the method including:
transmitting, through a communication medium or network, a media stream for playing on at least one client device; and
transmitting, in the transmitted media stream or in data transmitted along with the transmitted media stream, an indicator indicating that a media content susceptible of having a local match being already locally stored on the at least one client device is about to be transmitted as part of the media stream being transmitted or being transmitted as part of the media stream being transmitted, wherein
a media identifier is sent along with the transmitted media stream, the media identifier enabling the at least one client device to determine whether a local match for a media content about to be transmitted as part of the media stream being transmitted or being transmitted as part of the media stream being transmitted is locally stored, and
the media identifier is separate and distinct from the indicator indicating that the media content susceptible of having a local match.

13. The method according to claim 12, wherein transmitting, through the communication medium or network, the media stream is carried out in a unicast or multicast manner.

14. A client device for receiving and playing a media stream, the client device comprising:
a memory; and
a processing unit comprising one or more processors coupled to the memory, wherein the client device is configured to:
perform a first playing procedure, wherein the first playing procedure comprises:
transmitting, by the client device to a content server, a request related to a media content item;
receiving, at the client device, meta-information transmitted by the content server, the meta-information related to the media content item and comprising an indicator that the media content item is susceptible of being locally stored and a media identifier for identifying the media content item, wherein the indicator and the media identifier are separate and distinct;
detecting, in the meta-information, the indicator indicating that the media content item is susceptible of being locally stored; and
as a consequence of detecting the indicator, performing a second playing procedure, wherein the second playing procedure comprises: i) determining, based on the media identifier included in the meta-information, whether there exists in a local storage a locally stored media content item corresponding to media content item identified by the media identifier; and ii) as a consequence of determining that there exists in the local storage the locally stored media content item, playing the media content item based on at least the locally stored media content item.

15. The client device according to claim 14, wherein the client device is further configured for at least temporarily not receiving the media stream through a communication medium or network.

16. The client device according to claim 14, wherein the media stream includes at least one of an audio stream component and a video stream component.

17. The client device according to claim 15, wherein the communication medium or network includes a packet-switched network.

18. The client device according to claim 14, the client device being at least one of:
an internet radio receiving and playing device,
an internet protocol television, here abbreviated as IPTV, receiving and playing device,
an in-vehicle receiving and playing device,
a radio communication device,
a mobile phone, and
a computer.

19. The client device according to claim 14, wherein the client device is further configured for:
determining that a media content about to be received or being received is suitable for local replication; and
storing the media content determined to be suitable for local replication on the client device or on a storage device in the vicinity of the client device.

20. The client device according to claim 19, wherein the client device is further configured such that determining that a media content item about to be received or being received is suitable for local replication includes determining that a repetition frequency of the media content item is larger than a threshold.

21. The client device according to claim 14, further including a communication interface for receiving at least one media content through a communication medium or network in advance of receiving the at least one media content as part of the media stream.

22. The client device according to claim 21, wherein the communication interface is operated at a time when the load on the communication medium or network is less than a threshold or expected to be less than a threshold.

23. The client device according to claim 21, wherein the communication interface is further configured such that the at least one media content that is received in advance is selected at least based on a playing profile associated with the client device.

24. The client device according to claim 14, wherein
the client device is further configured for, before playing the media content, unlocking the locally stored media content item using a digital key.

25. A transmitting device for transmitting a media stream, the transmitting device comprising:
a memory;
a transmitter; and
a processing unit comprising one or more processors coupled to the memory and the transmitter, wherein the transmitting device is configured to:
employ the transmitter to transmit, through a communication medium or network, a media stream for playing on at least one client device; and
employ the transmitter to transmit, in the transmitted media stream or in data transmitted along with the transmitted media stream, a media identifier and an indicator, separate and distinct from the media identifier, indicating that a media content susceptible of being already locally stored on the at least one client device is about to be transmitted as part of the media stream being transmitted or being transmitted as part of the media stream being transmitted, wherein the media identifier is for enabling the at least one client device to determine whether a local match for a media content about to be transmitted as part of the media stream being transmitted or being transmitted as part of the media stream being transmitted is locally stored.

26. The transmitting device according to claim 25, configured for transmitting, through the communication medium or network, the media stream in a unicast or multicast manner.

27. A computer program product comprising a non-transitory computer readable medium storing computer readable instructions configured, when executed on a client device, to cause the client device to carry out the method of claim 1.

28. A computer program product comprising a non-transitory computer readable medium storing computer readable instructions configured, when executed on a transmitting device, to cause the transmitting device to carry out the method of claim 12.

* * * * *